T. S. SMITH & C. C. BOYLE.
Seed-Planter and Fertilizer-Distributor.

No. 202,878. Patented April 23, 1878.

WITNESSES

INVENTORS
Thomas S. Smith.
Christopher C. Boyle.

ATTORNEYS

UNITED STATES PATENT OFFICE.

THOMAS S. SMITH, OF SUBLIGNA, AND CHRISTOPHER C. BOYLE, OF ALPINE, GEORGIA.

IMPROVEMENT IN SEED-PLANTER AND FERTILIZER-DISTRIBUTER.

Specification forming part of Letters Patent No. 202,878, dated April 23, 1878; application filed March 2, 1878.

*To all whom it may concern:*

Be it known that we, THOMAS S. SMITH, of Subligna, Chattooga county, and State of Georgia, and CHRISTOPHER C. BOYLE, of Alpine, in the county of Chattooga and State of Georgia, have invented a new and valuable Improvement in Seed-Planter and Fertilizer-Distributer; and we do hereby declare that the following is a full, clear, and exact description of the construction and operation of the same, reference being had to the annexed drawings, making a part of this specification, and to the letters and figures of reference marked thereon.

Figure 1:
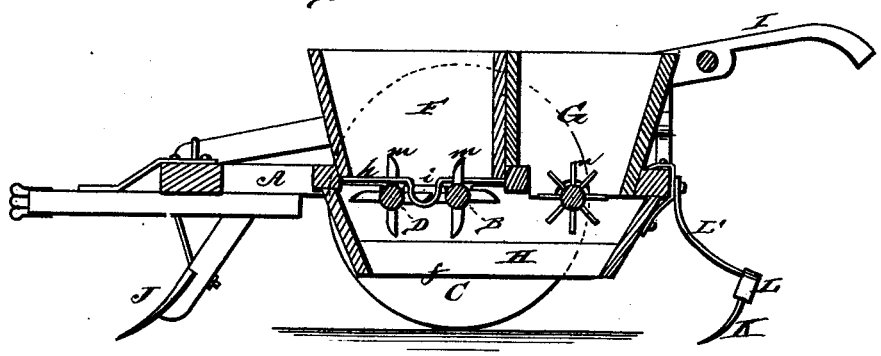
Figure 2:
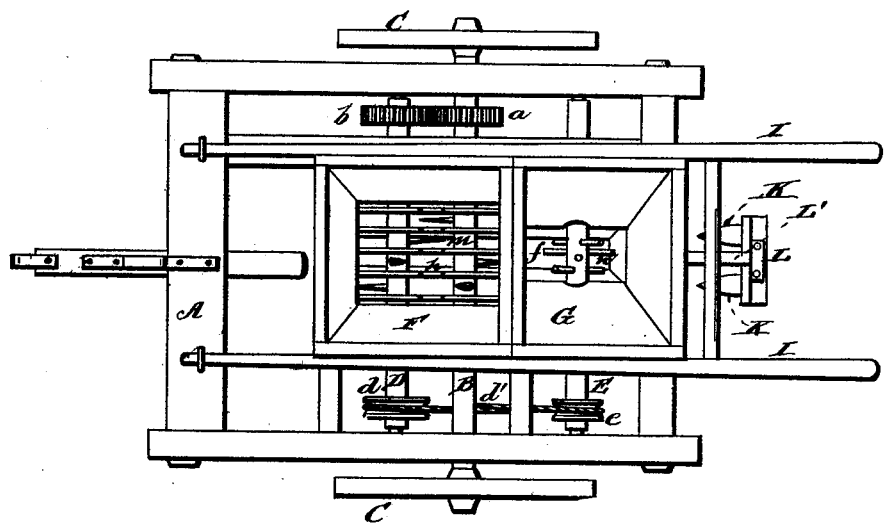

Figure 1 of the drawings is a representation of a longitudinal vertical section of our seed-planter and fertilizer-distributer, and Fig. 2 is a plan view thereof.

The nature of our invention consists in the construction and arrangement of a seed-planter and fertilizer-distributer, as will be hereinafter more fully set forth and claimed.

The annexed drawings, to which reference is made, fully illustrate our invention.

A represents a frame, of any suitable dimensions, provided on its under side with boxes, in which is placed the axle B, having on its ends the driving-wheels C C. On the axle B is a pinion, $a$, which meshes with a pinion, $b$, on a counter-shaft, D, in front of the axle. The shaft D is provided with a pulley, $d$, which, by a crossed belt, $d'$, connects with a pulley, $e$, on a shaft, E, near the rear end of the frame. The two shafts D and E receive thus their motion from the axle B. On top of the frame are secured two hoppers, F and G, and below the same is an elongated trough, H, having a central longitudinal slot, $f$, in its bottom. The hopper F is for the fertilizer, and is placed over the axle B and shaft D. This hopper is, in its bottom or lower end, provided with a series of rods, $h\ h$, which pass over the two shafts B D, and their centers are bent downward between said shafts, forming, as it were, a pocket, $i$, across the center of the hopper-bottom.

The shafts B and D are provided with knives $m\ m$, which work between the rods $h\ h$, and as the two shafts revolve toward each other these knives cut the fertilizer, agitating the same and bringing it down between the rods into the trough H, from whence it passes through the slot $f$ into the furrow.

The rear hopper G is for seed, and is located directly over the shaft E. On this shaft are suitable rods or pins $n\ n$, to stir the seed and carry it down into the trough, and from thence into the ground.

I I are the handles, secured to the front part of the frame, and passing rearward along the sides of the hoppers.

In the center, to the front end, of the frame A is attached the plow J, to which the team is hitched. To the rear end of the frame A is attached the coverer, composed of two shovel-plows, K K, attached to one head, L, and this, by a bar, L', connected to the frame.

What we claim as new, and desire to secure by Letters Patent, is—

The combination of the hoppers F and G, shafts B D, with knives $m\ m$, shafts E, with stirrers $n\ n$, slotted trough H, plow J, and coverers K, all constructed as described, and secured to a frame, A, mounted upon wheels, substantially as and for the purposes herein set forth.

In testimony that we claim the above we have hereunto subscribed our names in the presence of two witnesses.

THOMAS S. SMITH.
CHRISTOPHER C. BOYLE.

Witnesses:
E. J. MAGRUDER,
JNO. P. HART.